(12) United States Patent
Pau

(10) Patent No.: US 12,436,033 B2
(45) Date of Patent: Oct. 7, 2025

(54) APPARATUS AND METHOD TO MEASURE DIRECTION AND POLARIZATION OF ELECTROMAGNETIC WAVES

(71) Applicant: Arizona Board of Regents on Behalf of the University of Arizona, Tucson, AZ (US)

(72) Inventor: Stanley Pau, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 241 days.

(21) Appl. No.: 18/253,647

(22) PCT Filed: Nov. 18, 2021

(86) PCT No.: PCT/US2021/072482
§ 371 (c)(1),
(2) Date: May 19, 2023

(87) PCT Pub. No.: WO2022/109579
PCT Pub. Date: May 27, 2022

(65) Prior Publication Data
US 2024/0011836 A1    Jan. 11, 2024

Related U.S. Application Data

(60) Provisional application No. 63/116,299, filed on Nov. 20, 2020.

(51) Int. Cl.
*G01J 4/04*    (2006.01)

(52) U.S. Cl.
CPC ........................ *G01J 4/04* (2013.01)

(58) Field of Classification Search
CPC .......... G01J 3/2803; G01J 3/0224; G01J 3/36; G01J 3/02; G01J 3/0208; G01J 3/2823;
(Continued)

(56) References Cited

U.S. PATENT DOCUMENTS 5,936,575 A * 8/1999 Azzarelli ................. G01S 3/06
342/442
6,373,569 B1 * 4/2002 Herman ............... G02B 5/3083
356/364
(Continued)

FOREIGN PATENT DOCUMENTS

CN      109613343 B  * 10/2020  ............. G01R 29/08
DE  102018119096 B3 * 11/2019  ............. G01J 1/0429
(Continued)

OTHER PUBLICATIONS

International Search Report and Written Opinion mailed Feb. 14, 2022 for International Patent Application No. PCT/US2021/072482.
(Continued)

*Primary Examiner* — Michael P Stafira
(74) *Attorney, Agent, or Firm* — Perkins Coie, LLP

(57) ABSTRACT

Methods, systems and devices are described that enable simultaneous measurement of the direction and polarization of electromagnetic waves. One example device includes a first, a second and a third detector, each configured to receive and measure an irradiance of an incoming electromagnetic radiation, and each are positioned such that their normal vectors point in a first, a second and a third direction that are different from one another. At least one of the detectors is further configured to obtain polarization information associated with the incoming electromagnetic radiation. The measured irradiances from the first, the second and the third detectors and the obtained polarization information enable identification of the direction of propagation and polarization state of the incoming electromagnetic radiation.

28 Claims, 11 Drawing Sheets

(58) Field of Classification Search
CPC ....... G01J 2003/2826; G01J 2003/1213; G01J 3/0218; G01J 3/0205; G01J 4/04; G01J 3/26; G01J 3/0229; G01J 2003/2806; G01J 3/0256; G01J 1/4228; G01J 3/10; G01J 3/12; G01J 3/44; G01J 3/42; G01J 3/0262; G01J 3/021; G01J 9/00; G01J 2003/1239; G01J 3/0216; G01J 9/02; G01J 9/0246; G01J 2003/1234; G01J 2003/2813; G01J 3/0237; G01J 2003/1217; G01J 3/28; G01J 5/0806; G01J 2003/123; G01J 2003/1291; G01J 3/18; G01J 1/4257; G01J 3/0291; G01J 3/4406; G01J 4/00; G01J 5/0808; G01J 2003/262; G01J 5/20; G01J 1/0429; G01J 1/0448; G01J 2009/0261; G01J 3/0232; G01J 3/06; G01J 3/32; G01J 5/0802; G01J 5/0853; G01J 5/34; G01J 3/447; G01J 5/0846; G01J 5/0014; G01J 5/0025; G01J 5/02; G01J 2003/2866; G01J 2005/0077; G01J 2005/345; G01J 3/427; G01J 5/0022; G01J 5/0831; G01J 5/59; G01J 3/027; G01J 3/433; G01J 1/4204; G01J 2009/0257; G01J 3/50; G01J 2003/1243; G01J 2003/4275; G01J 3/0202; G01J 3/0286; G01J 9/04; G01J 1/44; G01J 3/0289; G01J 3/4531; G01J 1/42; G01J 2009/0288; G01J 3/0294; G01J 5/0821; G01J 5/80; G01J 2009/0276; G01J 3/024; G01J 3/0264; G01J 3/0297; G01J 3/504; G01J 5/0225; G01J 1/04; G01J 2003/283; G01J 2005/202; G01J 3/108; G01J 3/4412; G01J 5/00; G01J 5/08; G01J 5/0896; G01J 1/0411; G01J 1/0425; G01J 2001/448; G01J 2003/1226; G01J 3/0278; G01J 3/40; G01J 3/4338; G01J 3/46; G01J 5/53; G01J 5/602; G01J 1/0414; G01J 1/26; G01J 2003/1247; G01J 2009/0226; G01J 3/04; G01J 3/14; G01J 5/0007; G01J 5/07; G01J 2001/446; G01J 2005/0074; G01J 3/1256; G01J 3/51; G01J 5/0804; G01J 5/084; G01J 2009/0284; G01J 2009/0292; G01J 3/0254; G01J 3/0275; G01J 4/02; G01J 1/02; G01J 1/0233; G01J 2001/4493; G01J 2003/1221; G01J 2003/2869; G01J 2003/467; G01J 3/08; G01J 3/453; G01J 5/10; G01J 1/0238; G01J 1/32; G01J 11/00; G01J 2001/444; G01J 2003/064; G01J 2003/2833; G01J 2003/284; G01J 2003/466; G01J 2005/604; G01J 2009/0265; G01J 3/4532; G01J 5/0088; G01J 5/0803; G01J 9/0215; G01J 1/0209; G01J 1/0266; G01J 1/0403; G01J 1/0407; G01J 1/429; G01J 1/58; G01J 2001/4247; G01J 2003/1208; G01J 2005/106; G01J 3/1804; G01J 3/1838; G01J 3/45; G01J 3/465; G01J 5/06; G01J 1/00; G01J 1/0252; G01J 1/0271; G01J 1/0295; G01J 1/0492; G01J 2003/104; G01J 2003/1282; G01J 2009/023; G01J 3/00; G01J 3/0235; G01J 3/0243; G01J 3/0259; G01J 3/0272; G01J 3/2846; G01J 3/457; G01J 3/462; G01J 3/463; G01J 3/502; G01J 3/506; G01J 3/1895; G01J 2003/102; G01J 3/0248; G01J 1/0474; G01J 1/0477; G01J 1/0437; G01J 2003/4424; G01J 3/0213; G01J 2003/106; G01J 3/513; G01J 1/56; G01J 2001/0285; G01J 3/1809; G01J 5/0066; G01J 3/443; G01J 3/0227; G01J 3/22; G01J 3/524; G01J 5/28; G01J 1/08; G01J 1/0422; G01J 2003/1204; G01J 5/023; G01J 1/0418; G01J 2003/2873; G01J 2003/451; G01J 5/061; G01J 1/20; G01J 5/90; G01J 5/0003; G01J 5/58; G01J 5/60; G01J 1/0219; G01J 1/0488; G01J 2001/0257; G01J 2001/1636; G01J 2001/4242; G01J 2001/4261; G01J 2001/442; G01J 2003/4534; G01J 2005/607; G01J 2009/002; G01J 2009/0211; G01J 3/2889; G01J 3/4535; G01J 3/501; G01J 3/505; G01J 3/526; G01J 5/0018; G01J 5/0044; G01J 5/007; G01J 5/026; G01J 5/064; G01J 5/0801; G01J 5/0818; G01J 5/0837; G01J 5/0878; G01J 5/35; G01J 5/601

See application file for complete search history.

(56) References Cited

U.S. PATENT DOCUMENTS

| | | | |
|---|---|---|---|
| 6,674,532 B2 * | 1/2004 | VanDelden | G01J 4/04 356/491 |
| 7,372,568 B1 * | 5/2008 | Yao | G01J 4/04 356/369 |
| 8,866,997 B2 | 10/2014 | Pau et al. | |
| 10,254,453 B2 | 4/2019 | Pau et al. | |
| 2003/0103214 A1 | 6/2003 | Vandelden | |

FOREIGN PATENT DOCUMENTS

| | | | | |
|---|---|---|---|---|
| KR | 20070091605 A | * | 9/2007 | |
| WO | WO-2011097163 A1 | * | 8/2011 | ............ G02B 30/25 |
| WO | WO-2018194920 A1 | * | 10/2018 | ........... G01B 11/026 |
| WO | WO-2020030223 A1 | * | 2/2020 | ............ G01J 1/0429 |

OTHER PUBLICATIONS

Tu, Xingzhou, et al., "Optimized design of N optical filters for color and polarization imaging," Optics Express vol. 24, No. 3, p. 3011-3024, 2016.

* cited by examiner

APPARATUS AND METHOD TO MEASURE DIRECTION AND POLARIZATION OF ELECTROMAGNETIC WAVES

CROSS REFERENCE TO RELATED APPLICATIONS

This patent document is a 371 National Stage Application of International Patent Application No. PCT/US2021/072482, filed Nov. 18, 2021, which claims priority to the provisional application with Ser. No. 63/116,299, titled "APPARATUS AND METHOD TO MEASURE DIRECTION AND POLARIZATION OF ELECTROMAGNETIC WAVE," filed Nov. 20, 2020. The entire contents of the above noted applications are incorporated by reference as part of the disclosure of this document.

TECHNICAL FIELD

The disclosed embodiments relate to methods and devices for sensing and measurement of electromagnetic waves.

BACKGROUND

Electromagnetic waves are a form of energy characterized by oscillating electric and magnetic fields propagating at the speed of light, c=299,792,458 m/s. Examples of electromagnetic waves include gamma rays, x-ray, ultraviolet, visible, infrared radiation, microwaves and radio waves. Sensing and measurement of electromagnetic waves require detectors that are sensitive to the incoming radiation to produce output voltages or currents in response to the detected electromagnetic wave. With numerous applications that range from wireless communications, to navigation, to medical imaging and others, there is a need to improve the detection process by obtaining both the direction and polarization of the incoming waves while minimizing the number of measurements and/or detectors.

SUMMARY

The disclosed embodiments relate to methods and devices that use a plurality of sensors to simultaneously measure the direction and polarization of electromagnetic waves. The disclosed embodiments have applications in solar and radio wave tracking (e.g., WiFi and cell phone signals) that can be used for precision tracking of position and orientation of a moving or stationary object where the direction and polarization of the electromagnetic wave can serve as an external reference. The disclosed sensors can replace gyroscope and motion sensor in some applications.

One aspect of the disclosed embodiments relates to a detector system for measuring direction and polarization of an electromagnetic wave that includes a first, a second and a third detector, each configured to receive and measure an irradiance of an incoming electromagnetic radiation. The first detector positioned such that a normal vector to the first detector is pointing in a first direction, the second detector is positioned such that a normal vector to the second detector is pointing in a second direction, and the third detector is positioned such that a normal vector to the third detector is pointing in a third direction. The first, the second and the third directions are different from one another, at least one of the first, the second or the third detectors is further configured to obtain polarization information associated with the incoming electromagnetic radiation, and the measured irradiances from the first, the second and the third detectors and the polarization information enable identification of a direction of propagation and a polarization state of the incoming electromagnetic radiation.

DETAILED DESCRIPTION

Figure 1:
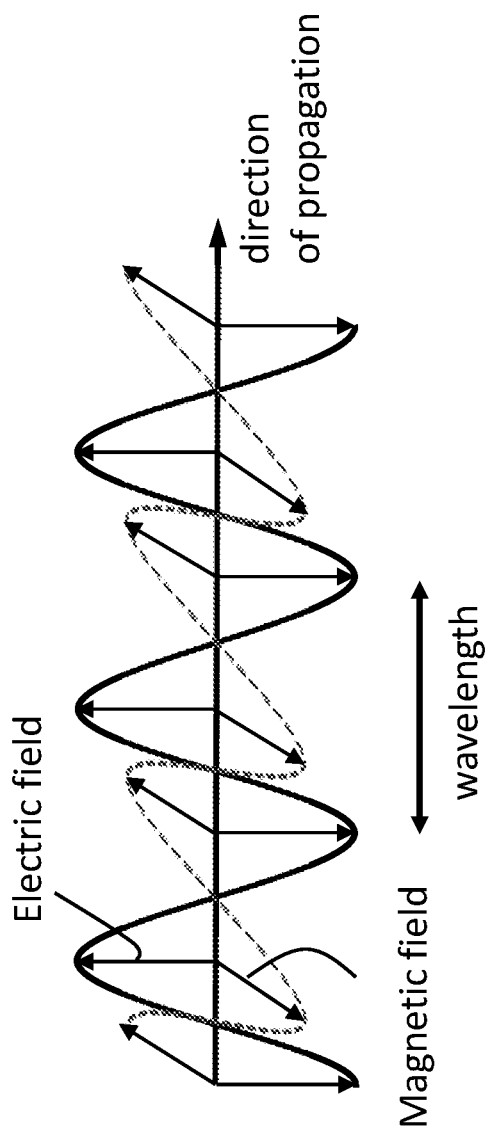
FIG. 1 is representation of a plane electromagnetic wave.
Figure 1:
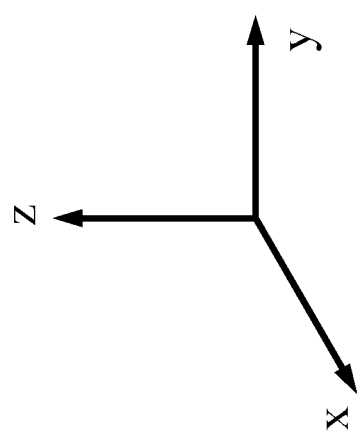

The electric and magnetic fields of an electromagnetic wave are perpendicular to each other and to the direction of propagation, which is often denoted by the wave vector $\overline{k}$. The oscillating frequency, f, is related to the wavelength, $\lambda$, by the speed of light $c=f\lambda$. FIG. 1 shows a plane electromagnetic wave which is characterized by the direction of the electric and magnetic fields, the wavelength, and propagation direction. The polarization state of the electromagnetic wave is determined by the direction of the electric field. The wave in FIG. 1 is linearly polarized in the z direction and propagates in the y direction. Any arbitrary electromagnetic wave can be described as a superposition of plane waves of different wavelengths and polarization states.

A conventional sensor, such as a photodiode, measures the intensity of the electromagnetic wave which is proportional to the square of the amplitude of the electric field. A silicon photodiode can be sensitive to a broad range of wavelengths, roughly spanning from 300 nm to 1100 nm, and to all polarization states. For many applications, there is a need to have a sensor that is sensitive only to a predefined wavelength range or polarization state. This is often accomplished by putting a filter, such as bandpass filter or polarization filter or both, in front of the sensor to transmit only the electromagnetic wave that has a predefined wavelength and polarization state.

Figure 2:
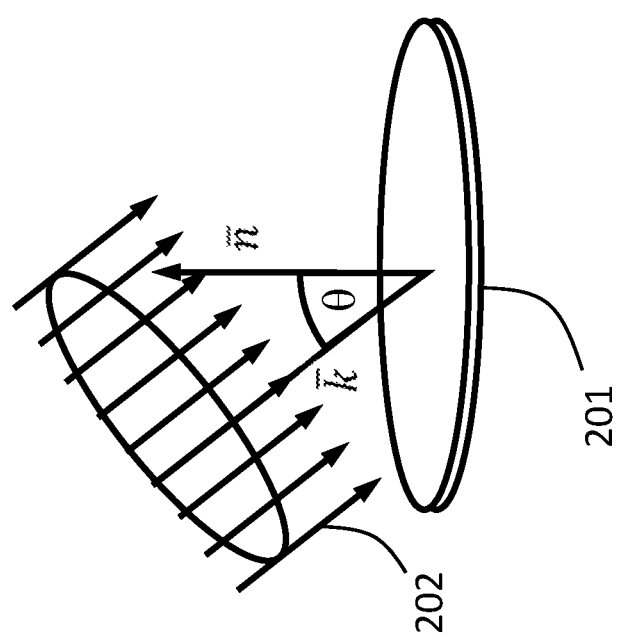
FIG. 2 illustrates a planar photodiode that receives an incident electromagnetic wave.

The signal obtained from a conventional sensor, such as a photodiode, depends on the angle of incidence of the incoming electromagnetic wave. FIG. 2 shows a planar photodiode 201 with a normal direction defined by a vector $\bar{n}$. Incident electromagnetic wave 202 has a propagating direction k making an angle θ relative to $\bar{n}$, where:

$$\bar{k}\cdot\bar{n}=|\bar{k}||\bar{n}|\cos(\theta) \quad \text{(Eq. 1)}.$$

The signal is highest when $\bar{k}$ is parallel to $\bar{n}$, and the wave is incident normal to the photodiode. The signal is lowest when $\bar{k}$ is perpendicular to $\bar{n}$, and the wave is perpendicular to the photodiode. The irradiance, E(θ), falling on the surface changes as the cosine of the incident angle, θ, and is described by the Lambert's cosine law:

$$E(\theta)=E_i\cos(\theta) \quad \text{(Eq. 2)}.$$

In Equation (2), $E_i$ is the incident irradiance.

The polarization state of the electromagnetic wave can be described by Stokes parameters $\bar{S}=[S_0\ S_1\ S_2\ S_3]$, where $S_0$ is the intensity, $S_1$ and $S_2$ represent the affinity towards 0° and 45° linear polarization, respectively, and $S_3$ represents the difference between right and left circular polarizations.

Figure 3A:
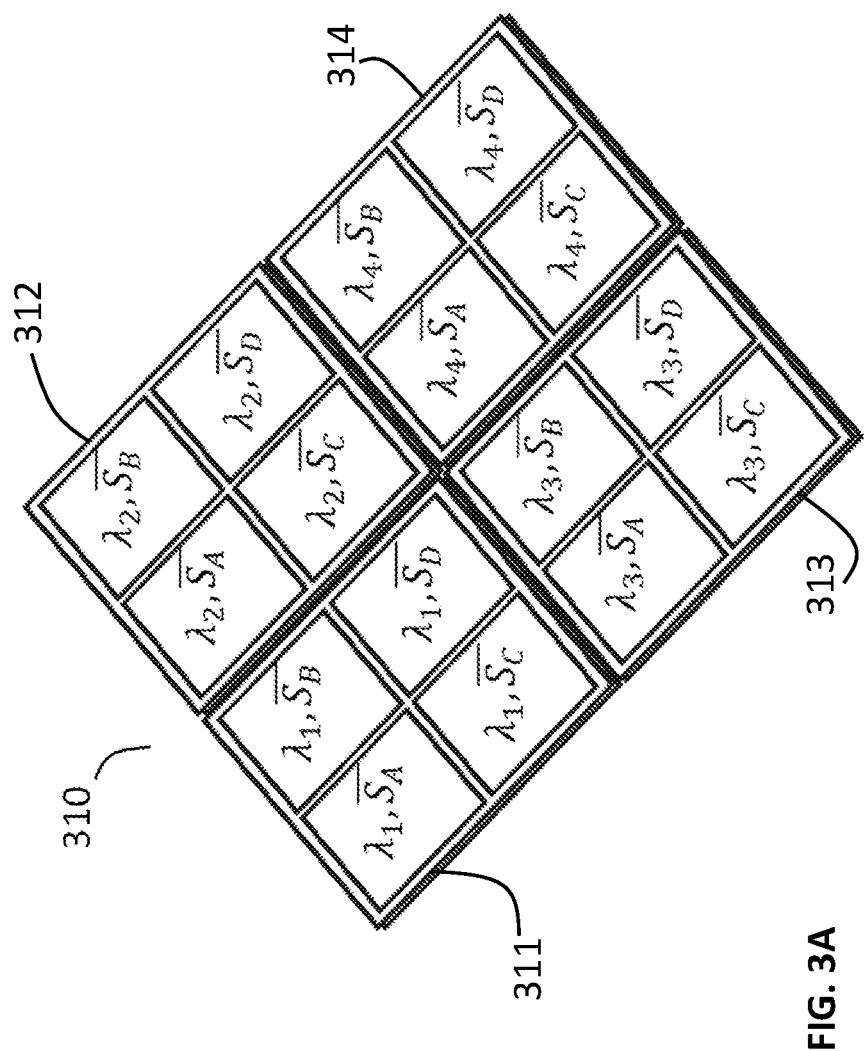
FIG. 3A illustrates two examples of wavelength and polarization sensitive detectors.
Figure 3A:
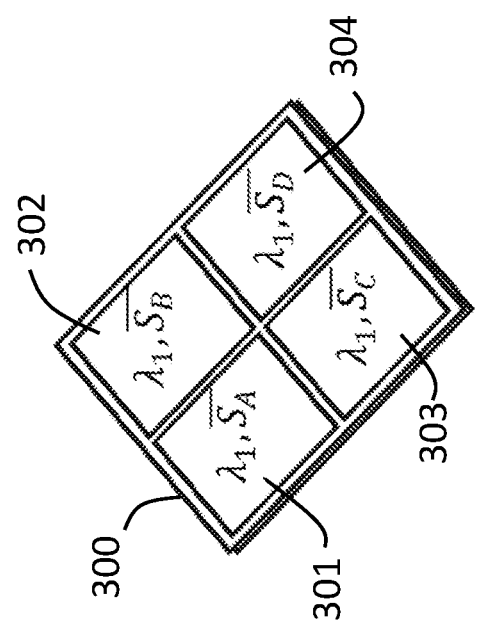

Examples of a wavelength and polarization sensitive detector are shown in FIG. 3A. The detector 300 (on the left side) includes four photodiodes 301, 302, 303 and 304. Photodiode 301 includes a filter that allows electromagnetic waves of wavelength $\lambda_1$ and polarization state $\bar{S_A}$ to pass therethrough. Photodetector 302 includes a filter that passes through electromagnetic waves of wavelength $\lambda_1$ and polarization state $\bar{S_B}$. Photodiode 303 includes a filter that passes through electromagnetic waves of wavelength $\lambda_1$ and polarization state $\bar{S_C}$. Photodiode 304 includes a filter that passes through electromagnetic waves of wavelength $\lambda_1$ and polarization state $\bar{S_D}$. The polarization states $\bar{S}_{A,B,C,D}$ can be linear, elliptical or circular polarization states. The detector 300 is designed to measure the four-component Stokes parameters of incoming electromagnetic wave at wavelength $\lambda_1$.

The photodiode can be arrayed to measure different wavelengths. The detector 310 on the right side of FIG. 3A illustrates an example arrayed detector that includes sixteen photodiodes, in four groups 311, 312, 313 and 314. Each group has four photodiodes. Array group 311 is designed to measure the four-component Stokes parameters of the incoming electromagnetic wave at wavelength $\lambda_1$. Array group 312 is designed to measure the four-component Stokes parameters of the incoming electromagnetic wave at wavelength $\lambda_2$. Array group 313 is designed to measure the four-component Stokes parameters of the incoming electromagnetic wave at wavelength $\lambda_3$. Array group 314 is designed to measure the four-component Stokes parameters of the incoming electromagnetic wave at wavelength $\lambda_4$.

Figure 3B:
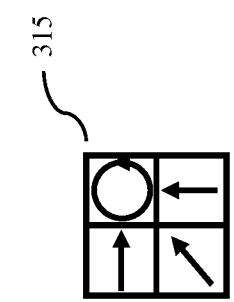
FIG. 3B illustrates examples of two-by-two detector arrays with linear, circular and elliptical polarizers.
Figure 3B:
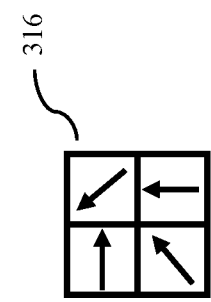
Figure 3B:
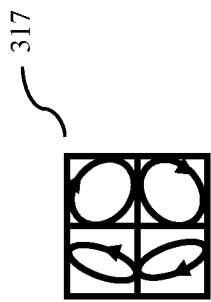

To further illustrate polarization states $\bar{S}_{A,B,C,D}$, FIG. 3B illustrates examples of two-by-two detector arrays 315, 316, 317 that include linear, circular and elliptical polarizers. Measurement of light from the four detectors in the array 315 permits the calculation of all four components of the Stokes vector. Measurement of light using the four detectors in array 316 permits the calculation of three components of the Stokes vector. Measurement of light from the four detectors in the array 317 permits the calculation of all four components of the Stokes vector. As illustrated in FIG. 3A, each array can also exhibit wavelength sensitivity to a particular wavelength, or range of wavelengths. Furthermore, the arrangement of the detectors does not have to lie on a square grid. U.S. Pat. No. 8,866,997, which is incorporated by reference, describes the design and fabrication of different polarizers using liquid crystal polymers.

Figure 4:
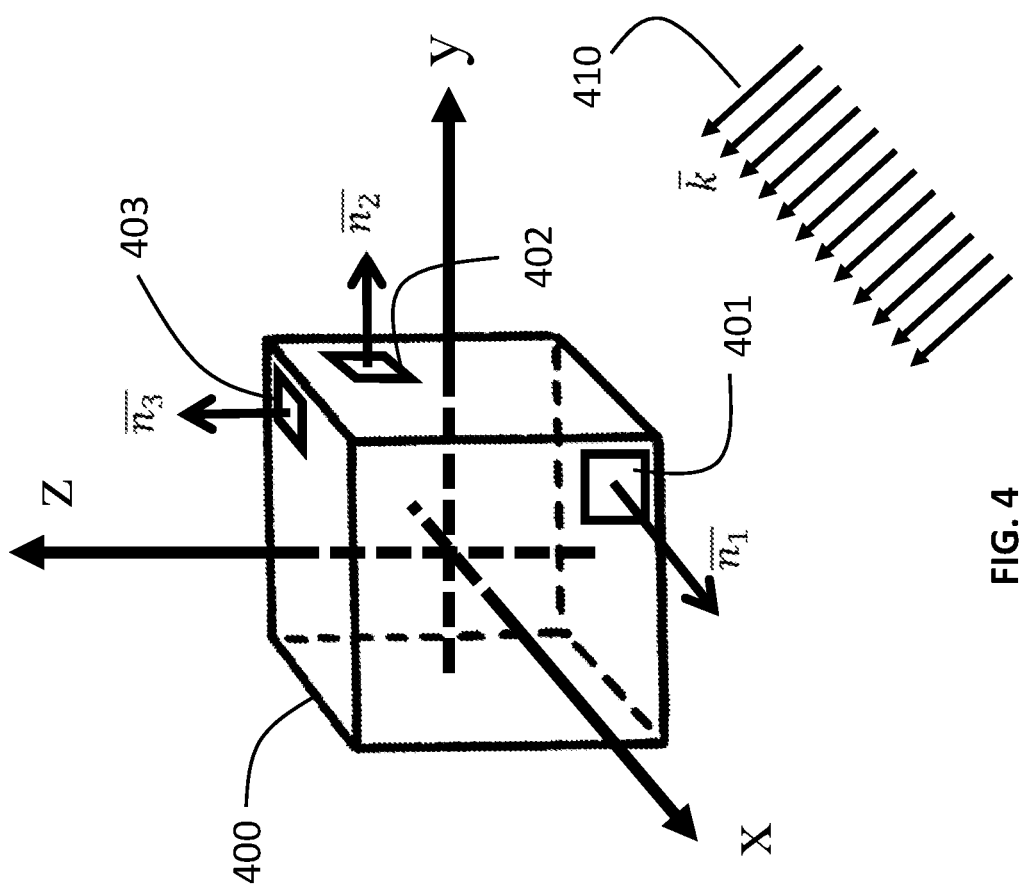
FIG. 4 illustrates a detector to simultaneously measure the direction and polarization of incoming electromagnetic waves in accordance with an example embodiment.

In accordance with the disclosed embodiments, an apparatus to simultaneously measure the direction and polarization of incoming electromagnetic waves is constructed that includes multiple detectors, such as arrayed photodetectors 300 and 310 illustrated in FIG. 3A, each having a normal vector n that is different from the normal vectors of other detectors. One example configuration is illustrated in FIG. 4 which shows a cube 400 that is arranged in a coordinate system where the sides of the cube are parallel to the axis of the coordinate system. The cube has six facets, and three detectors, 401, 402 and 403, which are placed on three of the facets of the cube. The detectors have different normal vectors $\bar{n}_{1,2,3}$ given by $\bar{n}_1=[1\ 0\ 0]$, $\bar{n}_2=[0\ 1\ 0]$, and $\bar{n}_3=[0\ 0\ 1]$. The electromagnetic wave 410 has a wave vector $\bar{k}=[k_x\ k_y\ k_z]$ and is incident on the three detectors. By Lambert's cosine law, the irradiance $E_{1,2,3}$ on each detector is given by:

$$E_1(\theta)=E_i\frac{\bar{k}\cdot\bar{n_1}}{|\bar{k}||\bar{n_1}|}=E_i\frac{\lambda}{2\pi}k_x, \quad \text{(Eq. 3a)}$$

$$E_2(\theta)=E_i\frac{\bar{k}\cdot\bar{n_2}}{|\bar{k}||\bar{n_2}|}=E_i\frac{\lambda}{2\pi}k_y, \quad \text{(Eq. 3b)},$$

$$E_3(\theta)=E_i\frac{\bar{k}\cdot\bar{n_3}}{|\bar{k}||\bar{n_3}|}=E_i\frac{\lambda}{2\pi}k_z. \quad \text{(Eq. 3c)}$$

It is evident from Equations (3a) to (3c) that the irradiance values measured by the three detectors allow the relative values of the wave vector components to be determined. If the incident irradiance, $E_i$, is known, then absolute values of the direction vector components can also be determined. In some embodiments, the detectors are pre-calibrated, and the comparison of the measured irradiances from the three detectors provides the wave vector of the incoming electromagnetic wave. If the incoming wave has components of different directions, the average direction of the different components is measured. For example, if two incoming electromagnetic waves of identical intensity, polarization, and temporal profile have wave vectors $\bar{k}_1$ and $\bar{k}_2$, then the measured wave vector is the average of the incident wave vectors, $\frac{1}{2}(\bar{k}_1+\bar{k}_2)$, assuming that there is little interference effect. As noted earlier in connection with FIG. 1, an electromagnetic wave is characterized not only by its propagation direction, but also by it electric and magnetic fields. Thus, to properly identify the electromagnetic wave, at least two out of three directions (i.e., direction of electric field, direction of magnetic field and direction of propagation) must be identified, which allows the identification of the third direction via, for example, the right hand rule. While Equations (3a) to (3c) allow the determination of the direction of propagation, the three detectors in the example configuration of FIG. 4 can simultaneously measure the direction and polarization of the incoming electromagnetic wave—the latter enabling the determination of the direction of the electric field. The configuration can be arrayed to form an array detector. The electromagnetic wave is assumed to be slowly varying such that the path length difference to the different facets is negligible.

Figure 5:
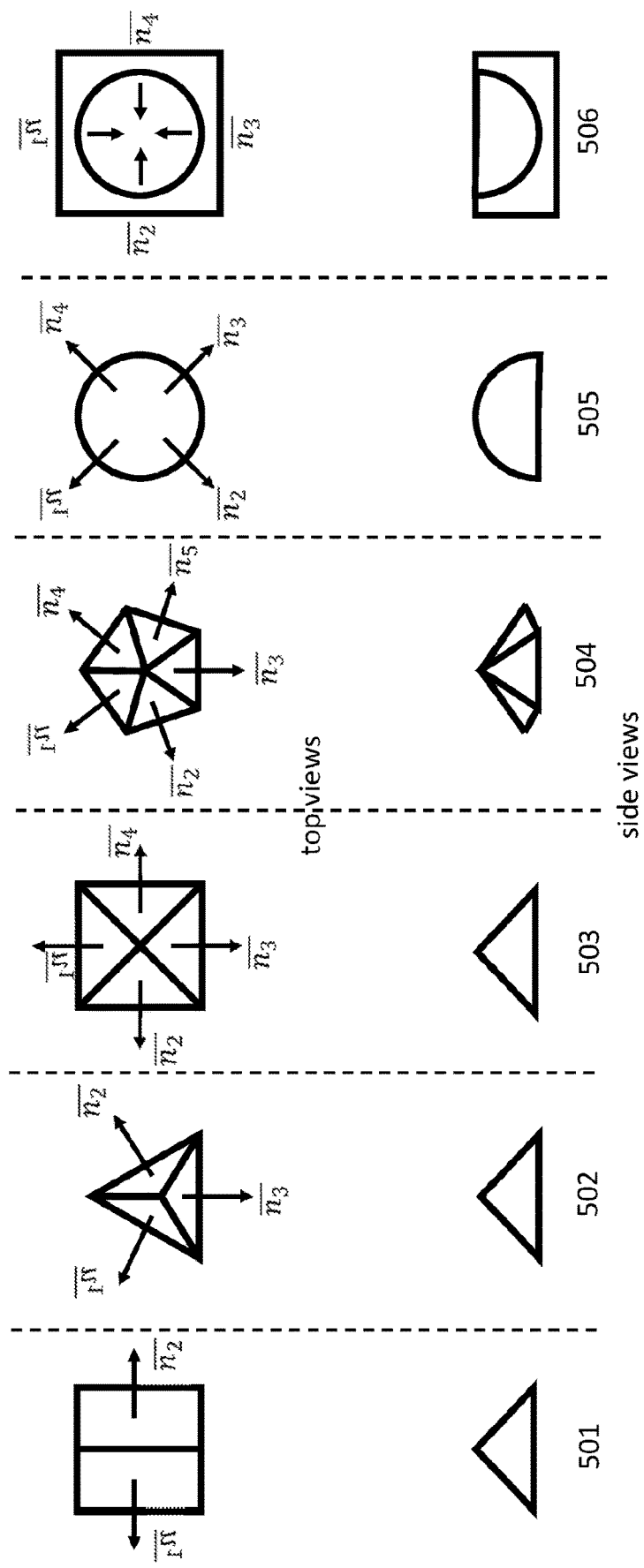
FIG. 5 illustrates different detector arrangements that allow simultaneous measurement of the direction and polarization of incoming electromagnetic waves in accordance with example embodiments.

FIG. 5 illustrates different variations of the detector arrangements in accordance with some embodiments. The top row illustrates top views of six different configurations where multiple detectors are positioned on different facets or surfaces, and the bottom row in FIG. 5 shows the corresponding side views. The configuration 501 represents a prism and can have two detectors on two facets with normal vectors $\bar{n}_1$ and $\bar{n}_2$. This represents a special case, where the two detectors are insufficient to determine all the components of the wave vector, but part of the components of the wave vector can be calculated. Thus, the configuration 501 may not be suitable for certain applications. The configuration 502 is similar to the example in FIG. 4 in that it has three detectors on three different facets. The configuration 503 has four detectors on four different facets. The four detectors oversample the wave front information and provide more accuracy in comparison with the configuration of three detectors in 502. This is suitable in situations where, for example, there are spurious signals from reflection or there is interference from other sources. The configuration 504 has five detectors on five different facets. The configuration 505 is a hemisphere and has four detectors with four different normal vectors on different positions on the hemisphere. Finally, the configuration 506 is a hollow hemisphere and has four detectors with four different normal vectors on different positions on the hemisphere. The configuration 505 corresponds to a convex surface, and the configuration 506 is a concave surface. The detectors on each surface can only detect incoming electromagnetic waves travelling toward that surface, i.e., not coming from behind the detectors. A common feature of the embodiments disclosed herein is that the normal vectors for the detectors are different from one another. It should be noted that while the detector sets depicted in FIG. 5 allow the measurement of electromagnetic radiation that is received from multiple directions, additional set of detectors and surfaces can be used to cover the entire $4\pi$ steradian for all incoming directions.

As noted above, the inclusion of more than three detectors in various configurations can improve the accuracy of the measurements by improving the signal-to-noise ratio. In general, for the cases where there are m facets and m detectors, where $m \geq 3$, the wave vector, $\overline{k}=[k_x\ k_y\ k_z]$, is related to the normal vectors of the m-th surface, $\overline{n}_m=[n_{m,x}\ n_{m,y}\ n_{m,z}]$ by:

$$\begin{bmatrix} E_1(\theta) \\ E_2(\theta) \\ \vdots \\ E_m(\theta) \end{bmatrix} = E_i \frac{\lambda}{2\pi} \begin{bmatrix} n_{1,x} & n_{1,y} & n_{1,z} \\ n_{2,x} & n_{2,y} & n_{2,z} \\ \vdots & \vdots & \vdots \\ n_{m,x} & n_{m,y} & n_{m,z} \end{bmatrix} \begin{bmatrix} k_x \\ k_y \\ k_z \end{bmatrix}. \quad \text{(Eq. 4)}$$

Here, $E_m(\theta)$, is the measured irradiance from a detector on the $m^{th}$ facet. The wave vector is proportional to the pseudoinverse of a matrix defined by rows of normal vectors.

$$\begin{bmatrix} k_x \\ k_y \\ k_z \end{bmatrix} = \frac{2\pi}{E_i \lambda} \begin{bmatrix} n_{1,x} & n_{1,y} & n_{1,z} \\ n_{2,x} & n_{2,y} & n_{2,z} \\ \vdots & \vdots & \vdots \\ n_{m,x} & n_{m,y} & n_{m,z} \end{bmatrix}^+ \begin{bmatrix} E_1(\theta) \\ E_2(\theta) \\ \vdots \\ E_m(\theta) \end{bmatrix}. \quad \text{(Eq. 6)}$$

The pseudoinverse provides a least square fit solution to the system of linear equations and, in many cases, can increase the signal-to-noise ratio of the measurement by increasing the number of intensity measurements.

One application of the disclosed embodiment relates to tracking of the position of the sun. The sensor can include detectors that are broadband and insensitive to polarization to serve as a solar tracker. The position of the sun is determined, and the signal is utilized to orient solar panel to maximize electricity generation. Another application of the disclosed embodiments relates to tracking of people. The sensor can include detectors that are sensitive to long wave infrared radiation, which is emitted by the human body or any heat generating object. For this application, the sensor may be more suitable for tracking single individuals that are not in a crowd since multiple objects and/or a large background signal can interfere with the measurements. Yet another application is the tracking of radio waves, such as WiFi or cell phone signals. The sensor can include antennas that are sensitive to a particular range of radio frequencies and polarizations. The direction of the source is determined based on the signals from the different antennas.

Figure 6:
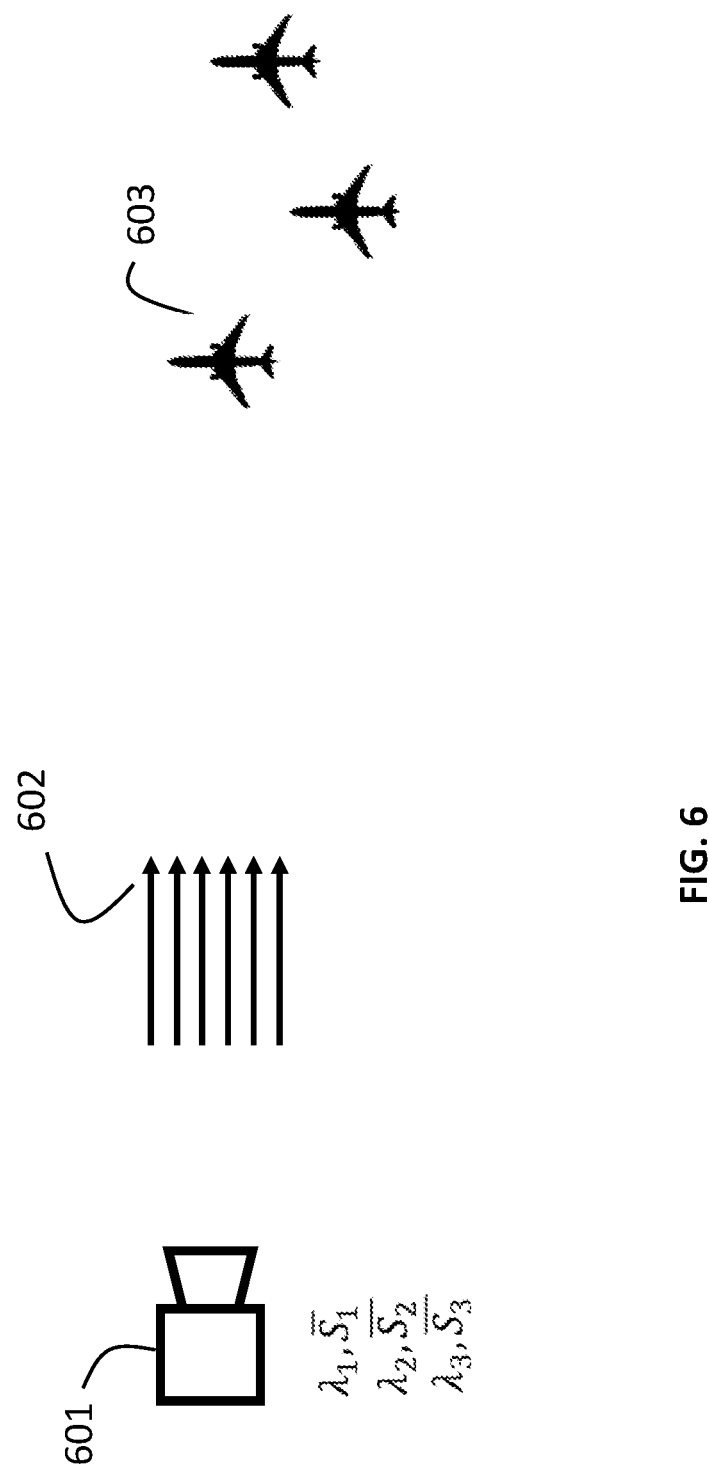
FIG. 6 illustrates an example configuration in which the direction of polarization and the directions of the elliptical axis can be used as a navigation or orientation reference.

The polarization of the electromagnetic wave is maintained when propagating through isotropic transparent media. If the wave is linearly polarized or elliptically polarized, the direction of polarization and the directions of the elliptical axis can be used as a navigation or orientation reference. A direction of polarization can be defined for linearly polarized electromagnetic wave as being parallel to, perpendicular to or having a fixed angle relative to the electric field of the electromagnetic wave. As an example, for linearly polarized light as shown in FIG. 1, the direction of polarization can be defined to be the z-axis which is parallel to the oscillating electric field. A direction can also be defined for elliptically polarized electromagnetic wave as being parallel to, perpendicular to, or having a fixed angle relative to the major elliptical axis of the elliptically polarized electromagnetic wave. The major and minor axis of the elliptically polarized light can be determined based on the Stokes parameters obtained from the measurements. FIG. 6 illustrates a diagram of this the application. A source 601 generates the electromagnetic waves 602 of different wavelengths, $\lambda_i$, and polarization states $\overline{S}_i$. In the example configuration of FIG. 6, the sources of the electromagnetic waves are located in a single location or in close proximity to one another. A moving and rotating object 603 (e.g., a plane) is configured to include a direction and polarization sensor which can detect the direction and polarization of the generated wave 602. A change in the position and orientation of the object 603 can be determined relative to the reference direction of the electromagnetic wave 602. For an object that needs to maintain a fixed orientation and position, the changes can be compensated in real time if the reference direction can be measured accurately. For an object that is moving toward a target, the information can also be used for navigation. Thus, the source 601 serves as a beacon when other references are not available. In some embodiments, the source can be modulated in time at different frequencies to provide a better signal-to-noise ratio.

Figure 7:
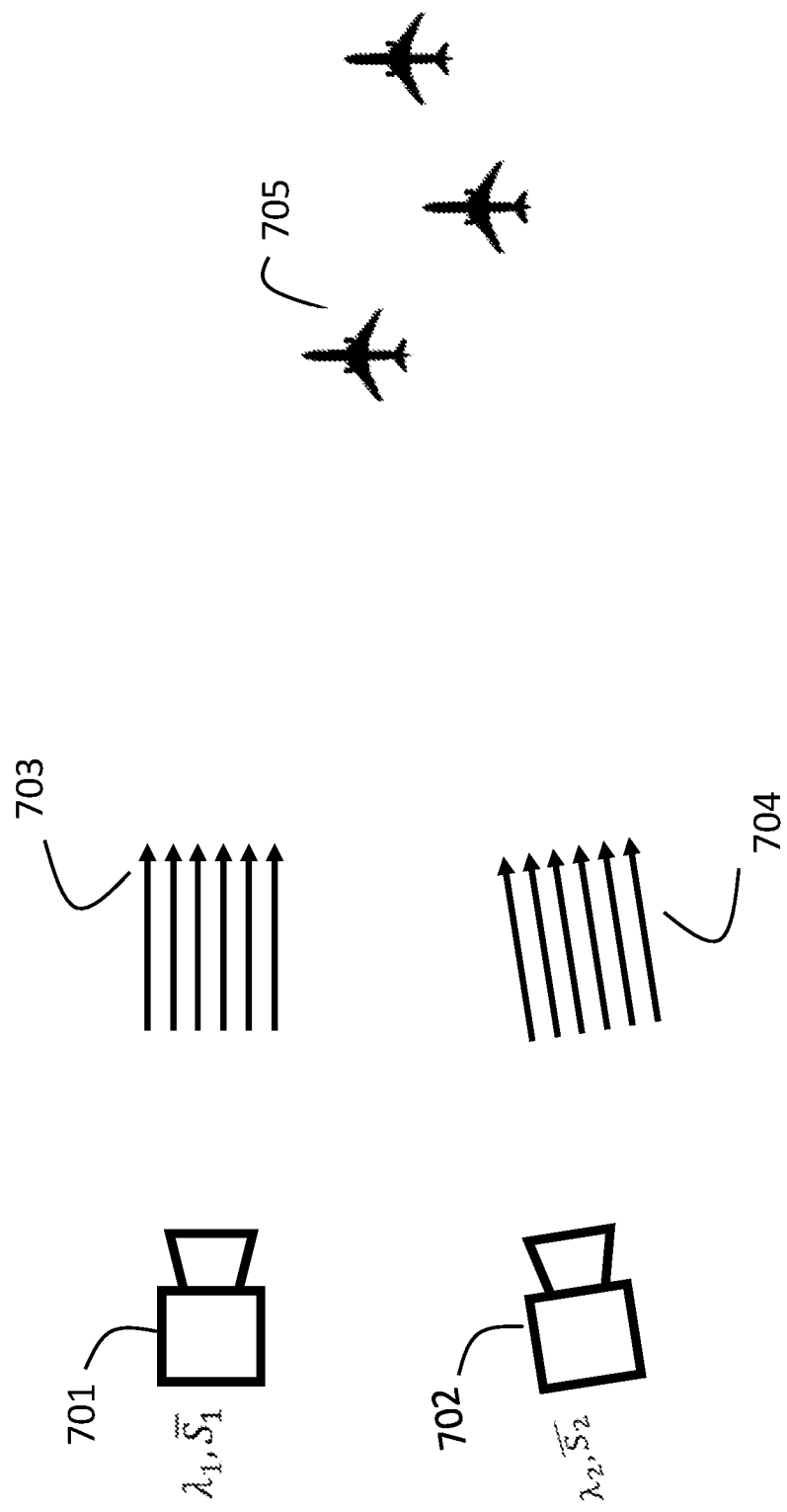
FIG. 7 illustrates a configuration that can be used for navigation applications in which multiple sources at different locations or orientations are used to increase the signal-to-noise.

In some embodiments, multiple sources at different locations and/or orientations are used to increase the signal-to-noise. FIG. 7 shows two sources 701 and 702. Source 701 generates electromagnetic waves 703 of wavelength, $\lambda_1$, and polarization states, $\overline{S}_1$. Source 702 generates electromagnetic waves 704 of wavelength, $\lambda_2$, and polarization states, $\overline{S}_2$. A moving and rotating object 705 has a direction and polarization sensor which can detect the direction and polarization of the generated waves 703 and 704. A change in the position and orientation of the object 705 can be determined relative to the reference directions. It should be noted that in some example configurations that are described herein, the detectors are wavelength sensitive in order to detect a particular wavelength (or range of wavelengths) that match the emission spectra of the electromagnetic wave from the source. This way, interference from background emissions is reduced and better measurements results are obtained.

Figure 8:
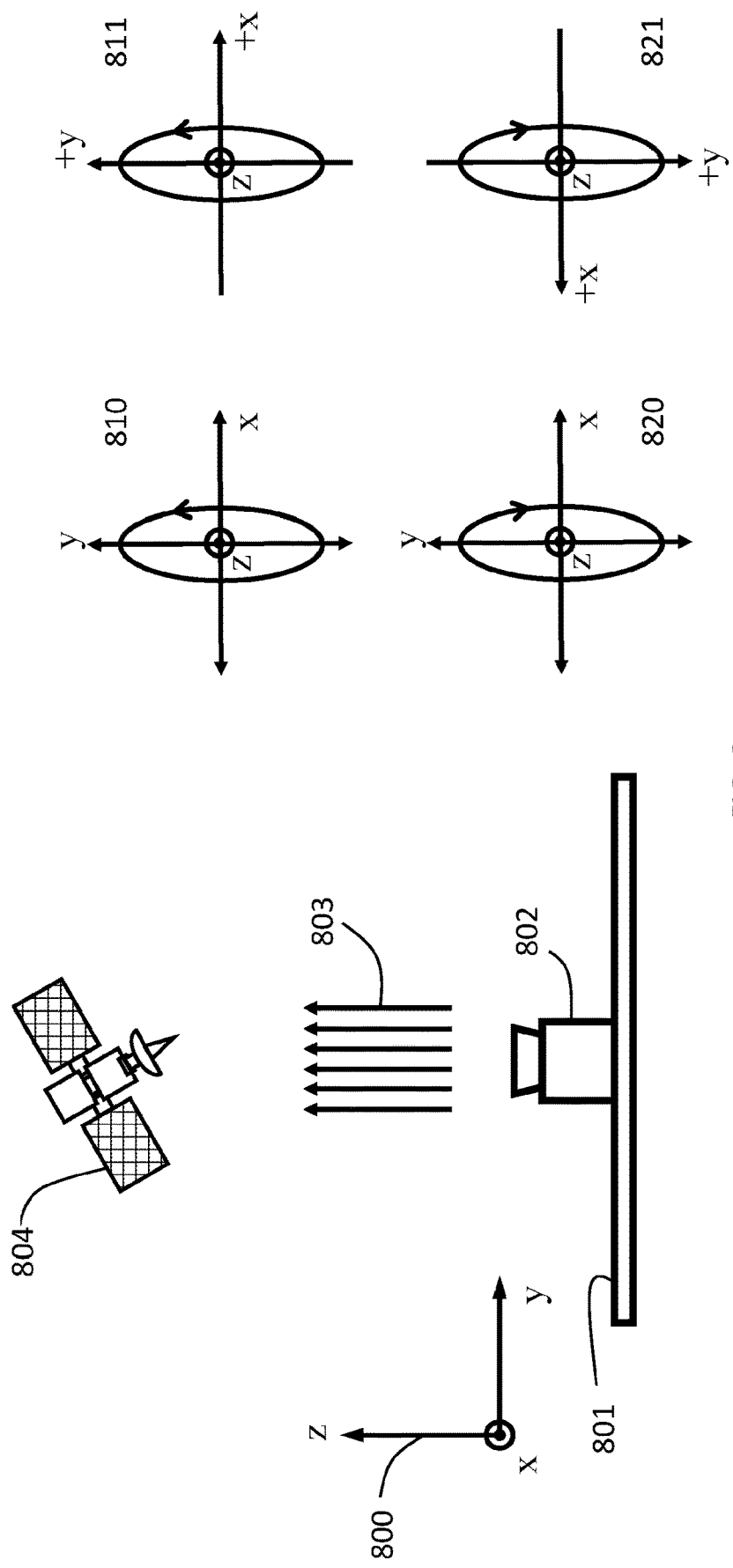
FIG. 8 illustrates a configuration that can be used to remove an ambiguity in determining the electric field direction in accordance with an example embodiment.

As noted in the previous section, the polarization of the electromagnetic wave does not exactly define a reference direction. If the wave is linearly polarized, the electric field oscillates in a fixed direction as a function of time in both positive and negative directions. For example, the electric field that is shown in FIG. 1 is oscillating along the +z and −z directions, and there is therefore an ambiguity in designating a reference direction, i.e., which is the positive direction, and which is the negative direction. Additional information is needed to resolve this ambiguity. This is of utmost importance, especially for navigation, to distinguish between moving toward or moving away from an object. The ambiguity can be removed by using a predefined protocol and by using elliptically polarized electromagnetic waves. An example is illustrated in FIG. 8. The coordinate system 800 defines three orthogonal directions. In this example, +y axis represents the east direction, and −y axis represents the west direction. A source 802 is situated on the ground 801, pointing toward the zenith, along the +z direction. Elliptically polarized electromagnetic wave 803 travels toward a satellite 804 that is in geostationary orbit. An object in geostationary orbit appears motionless, in a fixed position in the sky. A sensor on the satellite detects the direction and polarization of the wave 803. In this example, the measured state of polarization is right elliptical polarization state and is illustrated in 810, which shows the major axis is along the y-axis and the minor axis is along the x-axis. There is still an ambiguity as to which is the positive or negative direction. A protocol is defined to remove this ambiguity. For example, if the wave is right-handed elliptically polarized as shown in 810, then the coordinate system 811 is adapted. If the wave is left-handed elliptically polarized as shown in 820, then the coordinate system 821 is adapted. In this way, the direction of the y-axis is determined. The sender can specify the direction of the major axis by choosing the handedness of the electromagnetic wave.

It should be further noted that while at least three detectors are needed to unambiguously determine the propagation vector components (see, e.g., the configuration of FIG. 4), only one of those detectors needs to be polarization sensitive in order to unambiguously determine the polarization state (and thus the direction of the electric field) of the electromagnetic wave.

Figure 9:
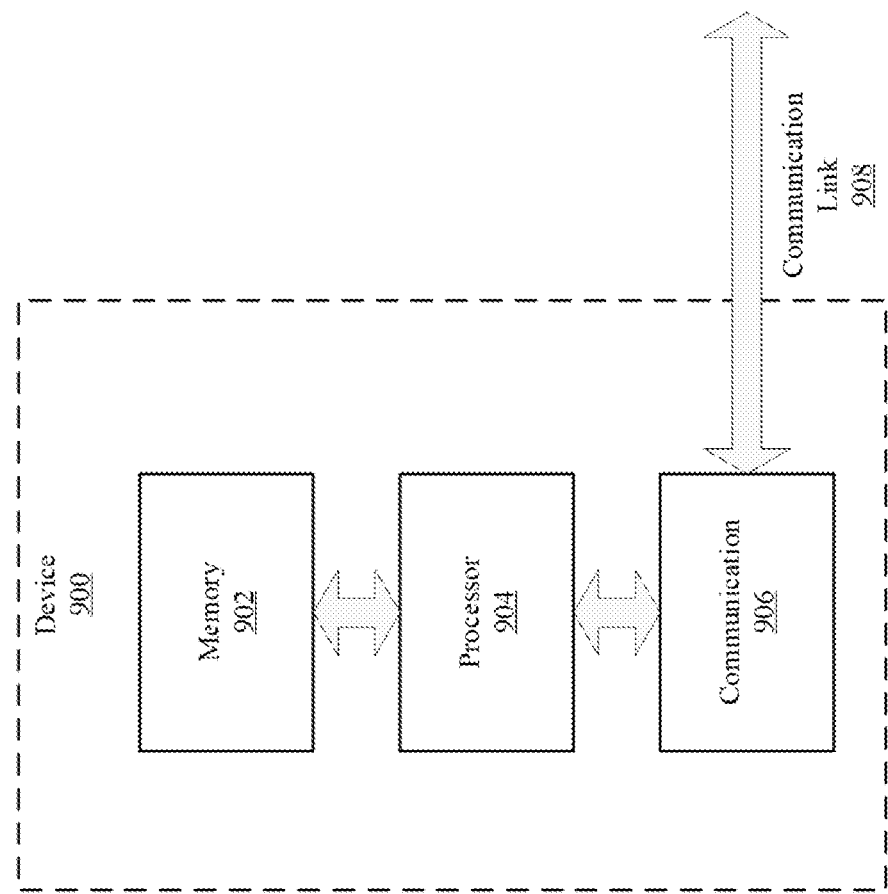
FIG. 9 illustrates a device that can be used to implement certain aspects of the disclosed embodiments.

It is understood that the various disclosed embodiments may be implemented individually, or collectively, in devices comprised of various optical components, electronics hardware and/or software modules and components. These devices, for example, may include the device 900 shown in FIG. 9. The device 900 can be used to implement at least in-part some of the various disclosed embodiments. The device in FIG. 9 can, for example, be implemented as part of a control system to control the operations of the disclosed electromagnetic wave sources and/or part of the control system that receives and processes the information and electrical signals from the disclosed detectors. The device 900 comprises at least one processor 904 and/or controller, at least one memory 902 unit that is in communication with the processor 904, and at least one communication unit 906 that enables the exchange of data and information, directly or indirectly, through the communication link 908 with other entities, devices, databases and networks. The communication unit 906 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The exemplary device 900 of FIG. 9 may be integrated as part of any devices or components to carry out any of the disclosed methods.

Figure 10:
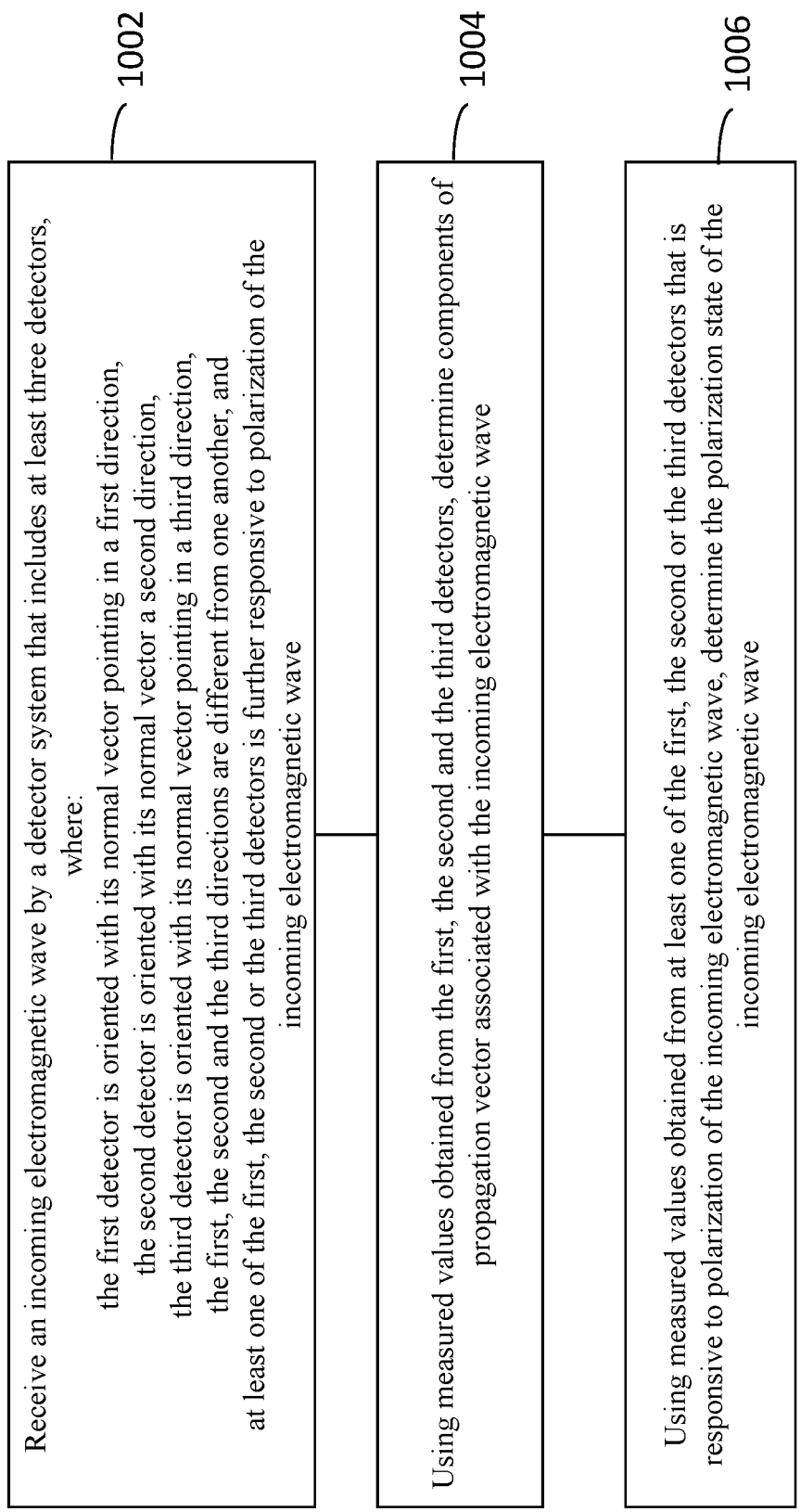
FIG. 10 illustrates a set of operations that can be carried out for determining a direction of propagation and polarization state of an electromagnetic wave in accordance with an example embodiment.

FIG. 10 illustrates a set of operations that can be carried out for determining a direction of propagation and polarization state of an electromagnetic wave in accordance with an example embodiment. At 1002, an incoming electromagnetic wave is received by a detector system that includes at least three detectors, where the first detector is oriented with its normal vector pointing in a first direction, the second detector is oriented with its normal vector a second direction, the third detector is oriented with its normal vector pointing in a third direction, the first, the second and the third directions are different from one another, and at least one of the first, the second or the third detectors is further responsive to polarization of the incoming electromagnetic wave. At 1004, using measured values obtained from the first, the second and the third detectors, components of propagation vector associated with the incoming electromagnetic wave are determined. At 1006, using measured values obtained from at least one of the first, the second or the third detectors that is responsive to polarization of the incoming electromagnetic wave, polarization state of the incoming electromagnetic wave is determined.

In one example embodiment, the set of operations include removing an ambiguity in the direction of electric field of the electromagnetic wave by determining a handed-ness of the polarization state, and identifying a positive or a negative direction associated with the electric field based on whether the polarization state is right-handed or left-handed. In another example embodiment, the detector system is positioned on a surface of an object, and the method for determining a direction of propagation and polarization state of the electromagnetic wave includes identifying a reference direction based on the measured values from the first, the second and the third detectors. In yet another example embodiment, the object is a moving object, and the above method for determining a direction of propagation and polarization state of the electromagnetic wave further comprises correcting a trajectory of the moving object in real time with respect to the reference direction.

According to another example embodiment, the method includes determining the polarization state based on four-component Stokes parameters. In yet another example embodiment, the detector system includes at least a fourth detector oriented with its normal vector pointing in a fourth direction different than the first, the second and the third directions, wherein the method for determining a direction of propagation and polarization state of the electromagnetic wave comprises using measurements by the fourth detector to determine the direction of propagation or the polarization state of the incoming electromagnetic wave with improved signal-to-noise ratio. In another example embodiment, the above noted method further includes using the measured values obtained from at the least one of the first, the second or the third detectors that is responsive to polarization of the incoming electromagnetic wave to determine a polarization direction of the incoming electromagnetic wave.

Another aspect of the disclosed embodiments relates to a detector system for measuring direction and polarization of an electromagnetic wave that includes a first detector configured to receive and measure an irradiance of an incoming electromagnetic radiation, the first detector positioned within the detector system such that a normal vector to the first detector is pointing in a first direction, a second detector configured to receive and measure the irradiance of the incoming electromagnetic radiation, the second detector positioned within the detector system such that a normal vector to the second detector is pointing in a second direction, and a third detector configured to receive and measure the irradiance of the incoming electromagnetic radiation, the third detector positioned within the detection system such that a normal vector to the third detector is pointing in a third direction. In the detector system, the first, the second and the third directions are different from one another, at least one of the first, the second or the third detectors is further configured to obtain polarization information associated with the incoming electromagnetic radiation, and the measured irradiances from the first, the second and the third detectors and the polarization information enable identification of a direction of propagation and a polarization state of the incoming electromagnetic radiation.

In one example embodiment, the at least one of the first, the second or the third detectors configured to obtain polarization information includes multiple segments, wherein each segment is configured to measure a particular polarization state. In another example embodiment, each segment includes a filter that allows one of a linear, elliptical or circular polarized light to reach the corresponding detector. In yet another example embodiment, the first, the second and the third detectors are responsive to a particular wavelength range of the incoming electromagnetic radiation. In still another example embodiment, the particular wavelength range includes one of: an infrared range of wavelengths, a visible range of wavelengths, an ultraviolet range of wavelengths, a radio frequency range of wavelengths, a cellular range of wavelengths, or a wireless communication range of wavelengths. For example, a wireless communication range specified in a WiFi standard or protocol can be implemented.

According to another example embodiment, at least one of the first, the second or the third detectors includes four segments, and wherein all four segments are responsive to substantially the same wavelength, or range of wavelengths, of the incoming electromagnetic radiation. In one example embodiment, at least one of the first, the second or the third detectors includes multiples of four segments arranged in four-segment sets, each set is responsive to a different wavelength, or range of wavelengths, of the incoming electromagnetic radiation compared to all other sets, and each set is configured to obtain polarization parameters associated with the incoming electromagnetic radiation within spectral responsivity range of the corresponding set.

In one example embodiment, the first, the second and the third directions are orthogonal to one another. In another example embodiment, the first, the second and the third directions correspond to normal vectors on three flat surfaces of a four-faceted pyramid. In yet another example embodiment, the detector system includes a fourth detector positioned within the detector system such that a normal vector to the fourth detector is pointing in a fourth direction different than the first, the second and the third directions, and the first, the second, the third and the fourth directions correspond to normal vectors on four flat surfaces of a five-faceted pyramid. In another example embodiment, the detector system includes a fourth and a fifth detector positioned within the detector system such that normal vectors to the fourth and the fifth detectors are pointing in a fourth and a fifth directions, respectively, which are different than the first, second and third directions. In this example configuration, the first, the second, the third, the fourth and the fifth directions correspond to normal vectors on five flat surfaces of a six-faceted pyramid.

In another example embodiment, the detector system includes a fourth detector positioned within the detector system such that a normal vector to the fourth detector is pointing in a fourth direction different than the first, the second and the third directions. In this example configuration, the first, the second, the third and the fourth directions correspond to normal vectors on four locations on a convex curved surface. In still another example embodiment, the detector system includes a fourth detector positioned within the detector system such that a normal vector to the fourth detector is pointing in a fourth direction different than the first, the second and the third directions, and the first, the second, the third and the fourth directions correspond to normal vectors on four locations on a concave curved surface.

In yet another example embodiment, the detector system includes at least a fourth detector positioned such that a normal vector to the fourth detector is pointing in a fourth direction different than the first, the second and the third directions. In this example configuration, measurements by the fourth detector enable a determination of the direction of propagation or the polarization state of the incoming electromagnetic radiation with improved signal-to-noise ratio compared to the direction of propagation or the polarization state of the incoming electromagnetic radiation determined without using the fourth detector.

According to another example embodiment, the detector system is positioned on a surface of an object, wherein the measured irradiances and the polarization information enable a determination of a reference direction that corresponds to the incoming electromagnetic radiation. In one example embodiment, the object is a moving object, and the reference direction enables correction of a trajectory of the moving object with respect to the reference direction. In another example embodiment, the first, the second and the third detectors are responsive to a first range of wavelengths, and the detector system further includes an additional set of detectors that are responsive to a second range of wavelengths, different than the first range of wavelengths. In this configuration, the measurements obtained based on the second set of wavelengths enable the determination of the reference direction with an improved accuracy compared to measurements obtained without using the additional set of detectors. In another example embodiment, the first and the second range of wavelengths are produced by a single source of electromagnetic radiation or by multiple sources that are positioned in close proximity of each other. In yet another example embodiment, the first and the second range of wavelengths are produced by multiple sources that are positioned apart from each other, and are configured to emit radiation along different directions.

In one example embodiment, the detector system is configured to remove an ambiguity in the direction of electric field of the incoming electromagnetic radiation by determining a handed-ness of the polarization state of the incoming electromagnetic radiation, and identifying a positive or a negative direction associated with the electric field based on whether the measured polarization state is right-handed or left-handed. In another example embodiment, the detector system includes a processor and a non-transitory memory with instructions stored thereon, wherein the instructions when executed by the processor configure the processor to receive electrical signals associated with the measurements from the first, the second and the third detectors and to determine the direction of propagation and the polarization state of the incoming electromagnetic radiation. In another embodiment, the polarization information enables a determination of a polarization direction of the incoming electromagnetic radiation.

Various information and data processing operations described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. While operations are depicted in the drawings in a particular order, this should not be understood as requiring that such operations be performed in the particular order shown or in sequential order, or that all illustrated operations be performed, to achieve desirable results. The features of the embodiments described herein may be combined in all possible combinations of methods, apparatus, modules, and systems.

What is claimed is:

1. A detector system for measuring direction and polarization of an electromagnetic wave, comprising:
    a first detector configured to receive and measure an irradiance of an incoming electromagnetic radiation, the first detector positioned such that a normal vector to the first detector is pointing in a first direction;
    a second detector configured to receive and measure the irradiance of the incoming electromagnetic radiation, the second detector positioned such that a normal vector to the second detector is pointing in a second direction; and
    a third detector configured to receive and measure the irradiance of the incoming electromagnetic radiation, the third detector positioned such that a normal vector to the third detector is pointing in a third direction, wherein:
    the first, the second and the third directions are different from one another,
    each of the first, second and third detectors having a flat detection surface for receiving the incoming electromagnetic radiation each facing a different direction compared to one another,
    at least one of the first, the second or the third detectors is further configured to obtain polarization information associated with the incoming electromagnetic radiation, and
    the measured irradiances from the first, the second and the third detectors and the polarization information enable identification of a direction of propagation and a polarization state of the incoming electromagnetic radiation.

2. The detector system of claim 1, wherein the at least one of the first, the second or the third detectors configured to obtain the polarization information includes multiple segments, wherein each segment is configured to measure a particular polarization state.

3. The detector system of claim 2, wherein each segment includes a filter that allows one of a linear, elliptical or circular polarized light to reach the corresponding detector.

4. The detector system of claim 1, wherein the first, the second and the third detectors are responsive to a particular wavelength range that includes one of:
    an infrared range of wavelengths,
    a visible range of wavelengths,
    an ultraviolet range of wavelengths,
    a radio frequency range of wavelengths,
    a cellular range of wavelengths, or
    a wireless communication range of wavelengths.

5. The detector system of claim 2, wherein at least one of the first, the second or the third detectors includes four segments, and wherein all four segments are responsive to substantially the same wavelength, or range of wavelengths.

6. The detector system of claim 2, wherein:
    at least one of the first, the second or the third detectors includes multiples of four segments arranged in four-segment sets,
    each set is responsive to a different wavelength, or range of wavelengths compared to all other sets, and
    each set is configured to obtain polarization parameters associated with the incoming electromagnetic radiation within spectral responsivity range of the corresponding set.

7. The detector system of claim 1, wherein the first, the second and the third directions are orthogonal to one another.

8. The detector system of claim 1, wherein the first, the second and the third directions correspond to normal vectors on three flat surfaces of a four-faceted pyramid.

9. The detector system of claim 1, comprising a fourth detector positioned such that a normal vector to the fourth detector is pointing in a fourth direction different than the first, the second and the third directions, wherein:
    the first, the second, the third and the fourth directions correspond to normal vectors on four flat surfaces of a five-faceted pyramid.

10. The detector system of claim 1, comprising a fourth and a fifth detector positioned such that normal vectors to the fourth and the fifth detectors are pointing in a fourth and a fifth directions, respectively, which are different than the first, second and third directions, wherein:
    the first, the second, the third, the fourth and the fifth directions correspond to normal vectors on five flat surfaces of a six-faceted pyramid.

11. The detector system of claim 1, comprising a fourth detector positioned such that a normal vector to the fourth detector is pointing in a fourth direction different than the first, the second and the third directions, wherein:
    the first, the second, the third and the fourth directions correspond to normal vectors on four locations on a convex curved surface.

12. The detector system of claim 1, comprising a fourth detector positioned such that a normal vector to the fourth detector is pointing in a fourth direction different than the first, the second and the third directions, wherein:

the first, the second, the third and the fourth directions correspond to normal vectors on four locations on a concave curved surface.

13. The detector system of claim 1, comprising at least a fourth detector positioned such that a normal vector to the fourth detector is pointing in a fourth direction different than the first, the second and the third directions, wherein:
measurements by the fourth detector enable a determination of the direction of propagation or the polarization state of the incoming electromagnetic radiation with improved signal-to-noise ratio compared to the direction of propagation or the polarization state of the incoming electromagnetic radiation determined without using the fourth detector.

14. The detector system of claim 1, wherein the detector system is positioned on a surface of an object, wherein the measured irradiances and the polarization information enable a determination of a reference direction that corresponds to the incoming electromagnetic radiation.

15. The detector system of claim 14, wherein the object is a moving object, and the reference direction enables correction of a trajectory of the moving object with respect to the reference direction.

16. The detector system of claim 14, wherein:
the first, the second and the third detectors are responsive to a first range of wavelengths, and
the detector system further includes an additional set of detectors that are responsive to a second range of wavelengths, different than the first range of wavelengths, and
the measurements obtained based on the second set of wavelengths enable the determination of the reference direction with an improved accuracy compared to measurements obtained without using the additional set of detectors.

17. The detector system of claim 16, wherein the first and the second range of wavelengths are produced by a single source of electromagnetic radiation or by multiple sources that are positioned in proximity of each other.

18. The detector system of claim 16, wherein the first and the second range of wavelengths are produced by multiple sources that are positioned apart from each other, and are configured to emit radiation along different directions.

19. The detector system of claim 1, configured to remove an ambiguity in the direction of electric field of the incoming electromagnetic radiation by determining a handed-ness of the polarization state of the incoming electromagnetic radiation, and identifying a positive or a negative direction associated with the electric field based on whether the measured polarization state is right-handed or left-handed.

20. The detector system of claim 1, comprising a processor and a non-transitory memory with instructions stored thereon, wherein the instructions when executed by the processor configure the processor to receive electrical signals associated with the measurements from the first, the second and the third detectors and to determine the direction of propagation and the polarization state of the incoming electromagnetic radiation.

21. The detector system of claim 1, wherein the polarization information enables a determination of a polarization direction of the incoming electromagnetic radiation.

22. A method for determining a direction of propagation and polarization state of an electromagnetic wave, comprising:
receiving an incoming electromagnetic wave by a detector system that includes at least three detectors, wherein:
a first detector is oriented with its normal vector pointing in a first direction,
a second detector is oriented with its normal vector a second direction,
a third detector is oriented with its normal vector pointing in a third direction,
the first, the second and the third directions are different from one another,
each of the first, second and third detectors having a flat detection surface for receiving the incoming electromagnetic wave each facing a different direction compared to one another, and
at least one of the first, the second or the third detectors is further responsive to polarization of the incoming electromagnetic wave;
using measured values obtained from the first, the second and the third detectors to determine components of propagation vector associated with the incoming electromagnetic wave; and
using measured values obtained from at the least one of the first, the second or the third detectors that is further responsive to polarization of the incoming electromagnetic wave to determine the polarization state of the incoming electromagnetic wave.

23. The method of claim 22, comprising removing an ambiguity in a direction of electric field of the electromagnetic wave by determining a handed-ness of the polarization state, and identifying a positive or a negative direction associated with the electric field based on whether the polarization state is right-handed or left-handed.

24. The method of claim 22, wherein the detector system is positioned on a surface of an object, and the method comprises identifying a reference direction based on the measured values from the first, the second and the third detectors.

25. The method of claim 24, wherein the object is a moving object, and the method further comprises correcting a trajectory of the moving object in real time with respect to the reference direction.

26. The method of claim 22, comprising determining the polarization state based on four-component Stokes parameters.

27. The method of claim 22, wherein the detector system includes at least a fourth detector oriented with its normal vector pointing in a fourth direction different than the first, the second and the third directions, wherein the method comprises using measurements by the fourth detector to determine the direction of propagation of the incoming electromagnetic wave with improved signal-to-noise ratio compared to a signal-to-noise ratio obtained without using the fourth detector.

28. The method of claim 22, further comprising using the measured values obtained from at the least one of the first, the second or the third detectors that is further responsive to polarization of the incoming electromagnetic wave to determine a polarization direction of the incoming electromagnetic wave.

* * * * *